United States Patent
Yanagisawa

(10) Patent No.: US 10,738,870 B2
(45) Date of Patent: Aug. 11, 2020

(54) TWO-COLOR MOLDING METHOD AND TWO-COLOR MOLDED BODY

(71) Applicant: Enplas Corporation, Saitama (JP)

(72) Inventor: Kazuma Yanagisawa, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 1063 days.

(21) Appl. No.: 15/111,603

(22) PCT Filed: Jan. 15, 2015

(86) PCT No.: PCT/JP2015/050889
§ 371 (c)(1),
(2) Date: Jul. 14, 2016

(87) PCT Pub. No.: WO2015/111491
PCT Pub. Date: Jul. 30, 2015

(65) Prior Publication Data
US 2016/0327145 A1    Nov. 10, 2016

(30) Foreign Application Priority Data
Jan. 22, 2014 (JP) .................. 2014-009059

(51) Int. Cl.
*F16H 55/06* (2006.01)
*B29C 45/16* (2006.01)
(Continued)

(52) U.S. Cl.
CPC ......... *F16H 55/06* (2013.01); *B29C 45/0005* (2013.01); *B29C 45/16* (2013.01);
(Continued)

(58) Field of Classification Search
CPC ............ B29C 45/1615; B29C 45/0005; B29C 2045/0012
See application file for complete search history.

(56) References Cited

U.S. PATENT DOCUMENTS 7,814,809 B2 * 10/2010 Shinohara ............... F16H 55/06
74/409
8,794,096 B2 * 8/2014 Oberle ................ B29C 45/0055
74/443
(Continued)

FOREIGN PATENT DOCUMENTS

JP    1-250668    10/1989
JP    9-52252     2/1997
(Continued)

OTHER PUBLICATIONS

International Search Report dated Feb. 10, 2015 in corresponding International (PCT) Application No. PCT/JP2015/050889.

*Primary Examiner* — Terence Boes
(74) *Attorney, Agent, or Firm* — Wenderoth, Lind & Ponack, L.L.P.

(57) ABSTRACT

A two-color molding method in which, when a secondary molded body is formed by covering the surface of a primary molded body made of a reinforcing-fiber-containing synthetic resin material with a reinforcing-fiber-free synthetic resin material, these synthetic resin materials may differ and the production cost does not increase. When a primary molded body is formed by injecting a molten reinforcing-fiber-containing synthetic resin material into a primary molding cavity, the molten reinforcing-fiber-containing synthetic resin material flows from one end toward the other end of the primary molding cavity and a short shot is performed. This exposes reinforcing fiber in a tooth of the primary molded body positioned at the other end of the primary molding cavity. In the secondary molding cavity, the tooth in which the reinforcing fiber is exposed is covered with a reinforcing-fiber-free synthetic resin material to form a synthetic resin gear as a two-color molded body.

6 Claims, 7 Drawing Sheets

(51) Int. Cl.
  *B29C 45/00*     (2006.01)
  *F16H 55/17*     (2006.01)
  *B29L 15/00*     (2006.01)
  *B29K 77/00*     (2006.01)
  *B29K 81/00*     (2006.01)
  *B29K 307/04*    (2006.01)
  *B29K 309/08*    (2006.01)

(52) U.S. Cl.
  CPC ......... *B29C 45/1615* (2013.01); *F16H 55/17* (2013.01); *B29K 2077/00* (2013.01); *B29K 2081/04* (2013.01); *B29K 2307/04* (2013.01); *B29K 2309/08* (2013.01); *B29K 2995/0021* (2013.01); *B29L 2015/003* (2013.01)

(56) References Cited

U.S. PATENT DOCUMENTS

| | | | | |
|---|---|---|---|---|
| 10,486,349 B2 * | 11/2019 | Nakamura | ........ | B29C 45/14336 |
| 2002/0043124 A1 * | 4/2002 | Shiga | ...................... | B29C 45/16 74/434 |
| 2009/0081402 A1 * | 3/2009 | Tomoda | ............ | B29C 45/14819 428/66.1 |
| 2012/0207982 A1 * | 8/2012 | Aso | ..................... | B29C 45/0005 428/164 |
| 2013/0337253 A1 * | 12/2013 | Yamaguchi | ......... | B29C 45/0005 428/220 |
| 2015/0376353 A1 * | 12/2015 | Takebe | .................. | B29C 70/345 428/161 |

FOREIGN PATENT DOCUMENTS

| | | |
|---|---|---|
| JP | 2001-304379 | 10/2001 |
| JP | 2002-347069 | 12/2002 |
| JP | 2004-52791 | 2/2004 |
| JP | 2009-154463 | 7/2009 |

* cited by examiner

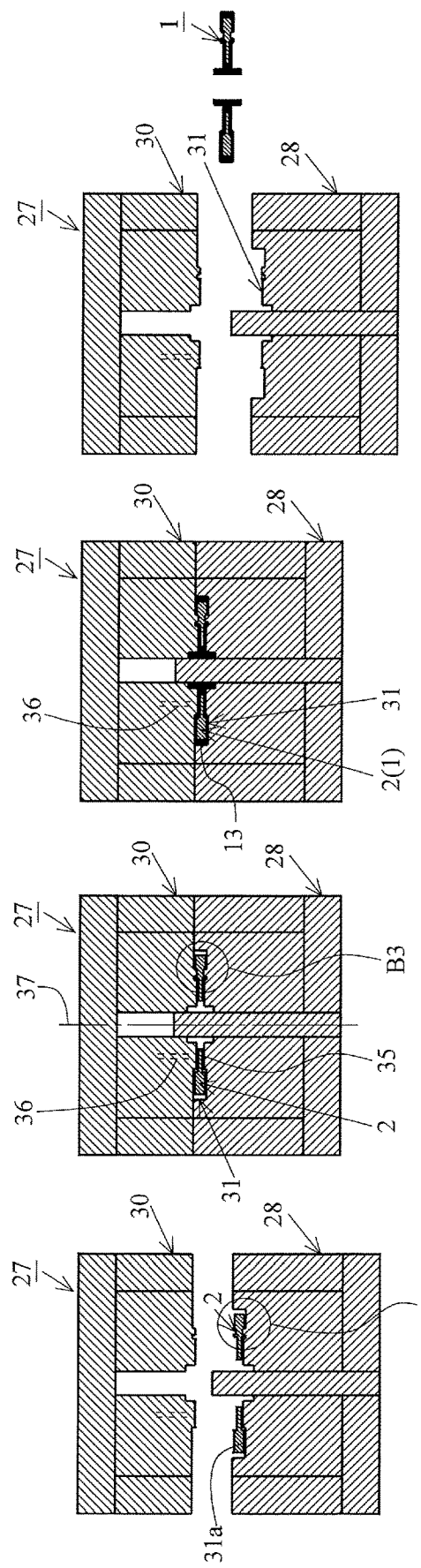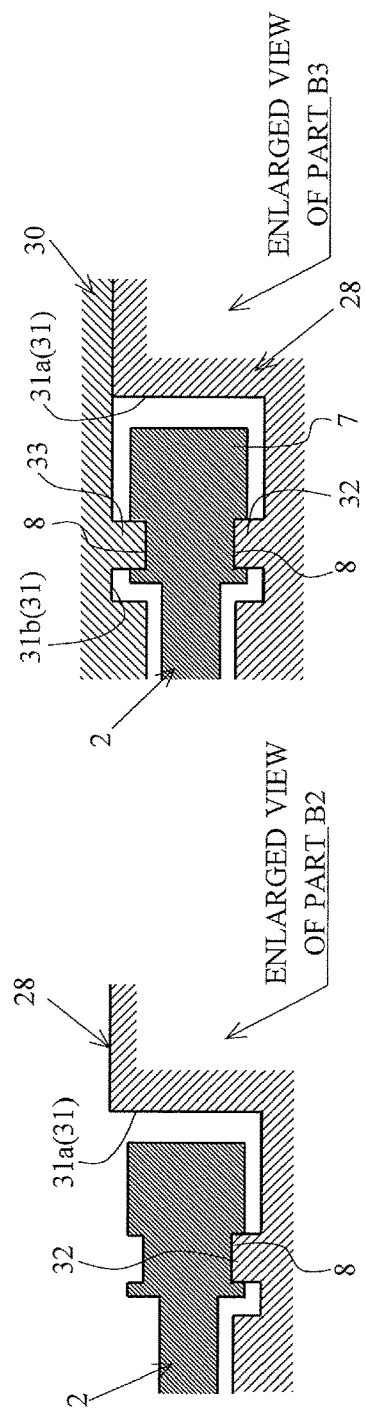

TWO-COLOR MOLDING METHOD AND TWO-COLOR MOLDED BODY

TECHNICAL FIELD

The present invention relates to a two-color molding method for forming a secondary molded body by covering the surface of a fiber reinforced synthetic resin body as a primary molded body with a reinforcing-fiber-free synthetic resin material and to a two-color molded body formed by the two-color molding method.

BACKGROUND ART

Recently, gears as power transmission components for, for example, copying machines and automobiles have light weight, high mechanical strength, high formation accuracy, and low operation noise during power transmission.

First Conventional Example

FIG. 7 illustrates such a conventional gear 100. In the gear 100 illustrated in FIG. 7, a main unit 101 is made of a hard synthetic resin material and a tooth shaped portion 102 is made of a soft synthetic resin material so as to obtain a predetermined mechanical strength using the main unit 101 made of the hard synthetic resin material and reduce the operation noise during power transmission (during engagement) using the tooth shaped portion 102 made of the soft synthetic resin material. When the conventional gear 100 is formed, the main unit 101 is injection-molded in a primary molding die, the main unit 101 formed by primary molding is accommodated in a secondary molding die, the soft synthetic resin material is injected into the secondary molding die, and the tooth shaped portion 102 is molded (two-color-molded) integrally with the outer periphery of the main unit 101 (see PTL 1).

However, in the conventional gear 100 illustrated in FIG. 7, since the material of the main unit 101 differs from that of the tooth shaped portion 102, the coupling state of the border between the main unit 101 and the tooth shaped portion 102 may become unstable. Accordingly, mechanical fixation means 103 having a convexoconcave or other mechanism is provided in the border between the main unit 101 and the tooth shaped portion 102 or the main unit 101 is fixed to the tooth shaped portion 102 using adhesive. Accordingly, in the conventional gear 100 illustrated in FIG. 7, the die structure becomes complicated or an adhesive application process needs to be provided separately, thereby increasing the production cost.

Second Conventional Example

A gear 110 illustrated in FIG. 8 has been proposed to solve such a problem. In the gear 110 illustrated in FIG. 8, a core 111 is made of a reinforcing-fiber-containing synthetic resin material and a tooth shaped portion 112 of the core 111 is covered with a covering material 113 (reinforcing-fiber-free synthetic resin material including the same synthetic resin material as the synthetic resin material of the core 111) so as to firmly couple the tooth shaped portion 112 of the core 111 to the covering material 113 including the same synthetic resin material. As a result, as compared with the gear 100 in the first conventional example, the production cost can be reduced in the gear 110 illustrated in FIG. 8 since mechanical fixation means does not need to be provided in the border between the tooth shaped portion 112 and the covering material 113 or the production cost can be reduced since the tooth shaped portion 112 does not need to be fixed to the covering material 113 using adhesive. As in the gear 100 according to the first conventional example, the gear 110 illustrated in FIG. 8 is formed (two-color molded) by injection-molding the core 111 into the primary molding die, accommodating the primary injection-molded core 111 in the secondary molding die, injecting the molten covering material 113 into the secondary molding die, and covering the tooth shaped portion 112 of the core 111 with the covering material 113 (see PTL 2).

CITATION LIST

Patent Literature

PTL 1: JP-A-1-250668 (see particularly the descriptions in the upper-right field on page 2)
PTL 2: JP-A-2001-304379 (see particularly the descriptions in paragraph [0017] and paragraphs [0025] to [0035])

SUMMARY OF INVENTION

Technical Problem

However, the problem with the gear 110 according to the second conventional example is that the covering material 113 and the core 111 are limited to a single synthetic resin material.

Therefore, an object of the invention is to provide a two-color molding method that does not limit the synthetic resin materials of the primary molded body and the secondary molded body to a single material and prevents the production cost from increasing in forming the secondary molded body by covering the surface of the fiber reinforced synthetic resin body (primary molded body formed by a reinforcing-fiber-containing synthetic resin material) with a reinforcing-fiber-free synthetic resin material and to provide a two-color molded body formed by this two-color molding method.

Solution to Problem

As illustrated in FIGS. 1 to 6, the invention relates to a two-color molding method injecting a molten reinforcing-fiber-containing synthetic resin material 2a into a primary molding cavity 12 of a primary molding die 11, forming a primary molded body 2 made of the reinforcing-fiber-containing synthetic resin material 2a, accommodating the primary molded body 2 in a secondary molding cavity 31 of a secondary molding die 27, injecting a molten reinforcing-fiber-free synthetic resin material (covering material 13) into the secondary molding cavity 31, and covering a surface of the primary molded body 2 with the reinforcing-fiber-free synthetic resin material (covering material 13) to mold a secondary molded body 1. In the two-color molding method according to the invention, when the molten reinforcing-fiber-containing synthetic resin material 2a is injected into the primary molding cavity 12, the molten reinforcing-fiber-containing synthetic resin material 2a is caused to flow from one end toward another end of the primary molding cavity 12 and a short shot is performed to prevent the other end of the primary molding cavity 12 from being filled with the molten reinforcing-fiber-containing synthetic resin material 2a. In addition, in the two-color molding method according to the invention, reinforcing fiber 26 is exposed in a part of the primary molded body 2, the part being positioned at the other end of the primary molding cavity 12, and the part in which the reinforcing fiber 26 is exposed is covered with the reinforcing-fiber-free synthetic resin material (covering material 13).

Advantageous Effects of Invention

According to the invention, by performing a short shot of the molten reinforcing-fiber-containing synthetic resin material during injection molding of the primary molded body (core), the reinforcing fiber can be exposed in the part of the primary molded body positioned at the other end of the primary molding cavity, the exposed reinforcing fiber can function as an anchor, and the joint strength between the covering material (reinforcing-fiber-free synthetic resin material) and the part of the primary molded body in which the reinforcing fiber is exposed, so adhesive does not need to be applied to the joint part between the primary molded body and the covering material or mechanical joint means having a convexoconcave or other mechanism does not need to be provided in the joint part between the primary molded body and the covering material, thereby preventing the production cost of a two-color molded body (synthetic resin gear) from increasing.

In addition, according to the invention, by performing a short shot of the molten synthetic resin material during injection molding of the primary molded body (core), the reinforcing fiber can be exposed in the part of the primary molded body positioned at the other end of the primary molding cavity, the exposed reinforcing fiber can function as an anchor, and the joint strength between the covering material (reinforcing-fiber-free synthetic resin material) and the part of the primary molded body in which the reinforcing fiber is exposed can be increased, so the reinforcing-fiber-containing synthetic resin material and the covering material are not limited to a single material.

BRIEF DESCRIPTION OF DRAWINGS

FIG. 4 is a diagram illustrating the injection molding process of the synthetic resin gear as a secondary molded body.

DESCRIPTION OF EMBODIMENTS

Embodiments of the invention will be described in detail below with reference to the drawings.
(Two-Color Molded Body)

Figure 1B:
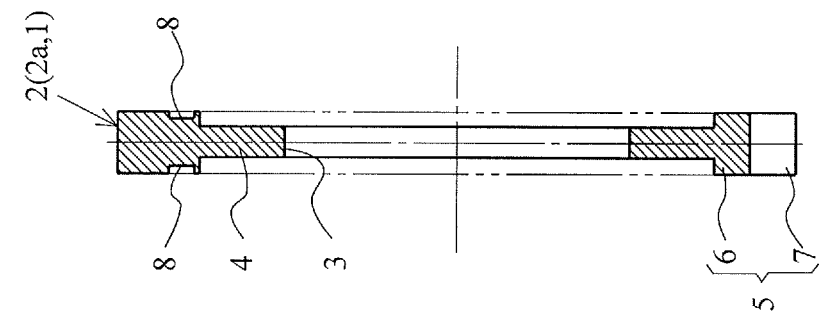
FIG. 1(a) is a front view illustrating a primary molded body of a synthetic resin gear and FIG. 1(b) is a cross sectional view illustrating the primary molded body taken along a line A1-A1 in FIG. 1(a).
Figure 1A:
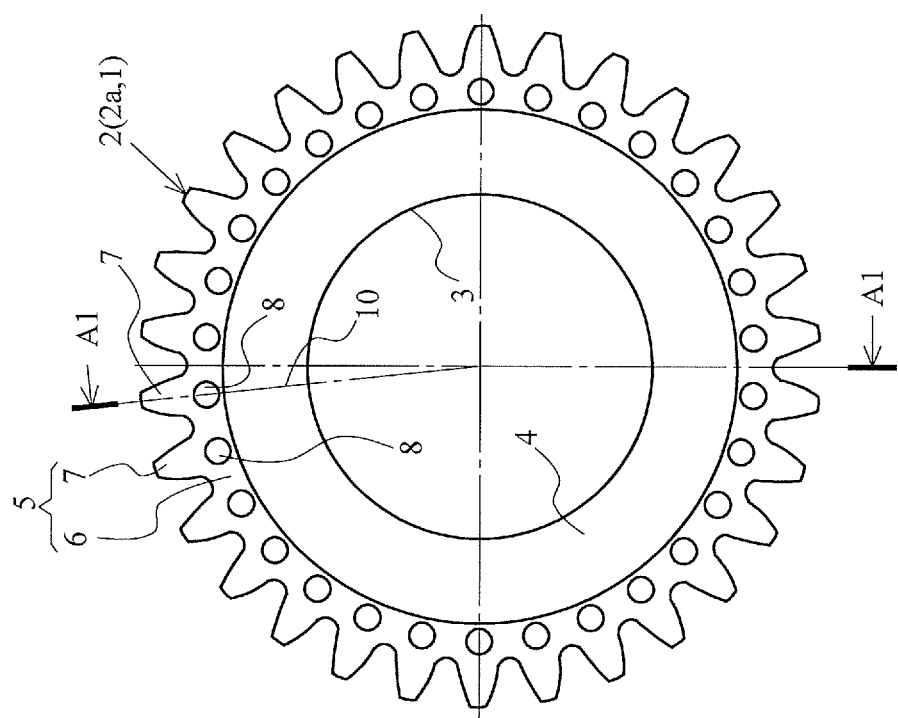
Figure 2B:
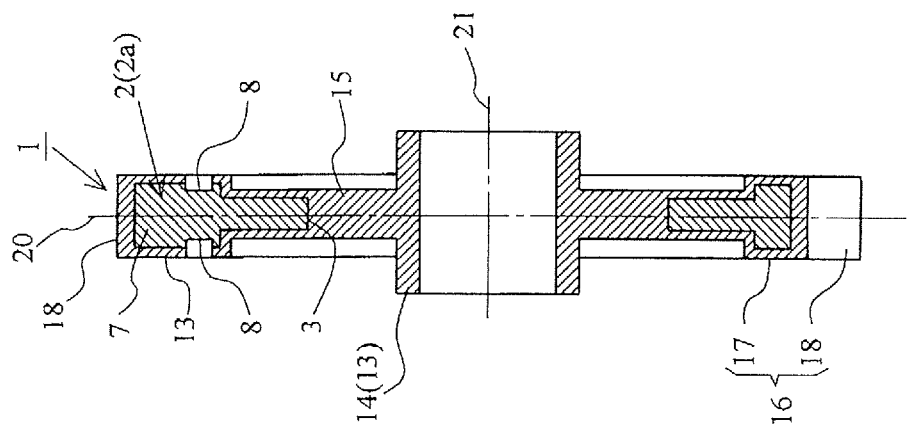
FIG. 2(a) is a front view illustrating a synthetic resin gear as a secondary molded body (two-color molded body) and FIG. 2(b) is a cross sectional view illustrating the synthetic resin gear taken along a line A2-A2 in FIG. 2(a).
Figure 2A:
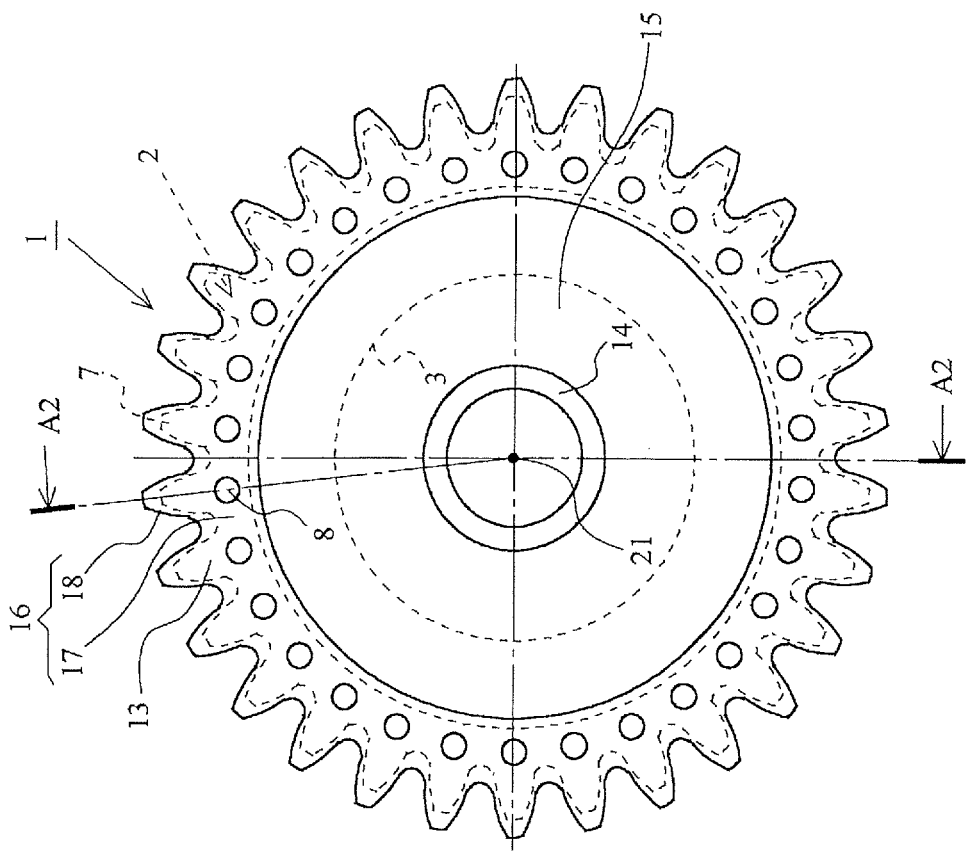

FIGS. 1 and 2 illustrate a synthetic resin gear 1 as a two-color molded body according to a first embodiment of the invention. FIG. 1(a) is a front view illustrating a primary molded body 2 of the synthetic resin gear 1 and FIG. 1(b) is a cross sectional view illustrating the primary molded body 2 taken along the line A1-A1 in FIG. 1(a). FIG. 2(a) is a front view illustrating the synthetic resin gear 1 as a secondary molded body (two-color molded body) and FIG. 2(b) is a cross sectional view illustrating the synthetic resin gear 1 taken along the line A2-A2 in FIG. 2(a).

In FIG. 1, the primary molded body (core) 2 includes a web 4, like a hollow disc, that has a hole 3 at the center and a tooth part 5 integrally formed at a radially outward end. In addition, the tooth part 5 includes a rim 6 formed annularly along the outer periphery end of the web 4 and a plurality of teeth 7 formed along the outer periphery of the rim 6. In addition, the rim 6 has bottomed circular recesses (positioning engagement parts) 8 corresponding one-to-one to the teeth 7, near the teeth 7. The centers of the recesses 8 are aligned with a tooth center line 10 of the teeth 7 and the recesses 8 are formed on both sides of the rim 6. The primary molded body 2 is formed by injecting a molten synthetic resin material (for example, nylon or PPS resin) 2a containing reinforcing fiber (for example, glass fiber or carbon fiber) into a primary molding cavity 12 of a primary molding die 11 so as to cause a short shot, as illustrated in FIG. 3 and the primary molded body 2 becomes the core of the synthetic resin gear 1 as a secondary molded body. In a short shot according to the invention, the amount of injection into the cavity is intentionally controlled so that the ratio between the part in which the cavity shape is accurately transferred and the part (which will be described later) in which reinforcing fiber is exposed becomes a desired ratio to form a primary molded body having an incomplete shape according to a plan during injection molding.

Figure 6:
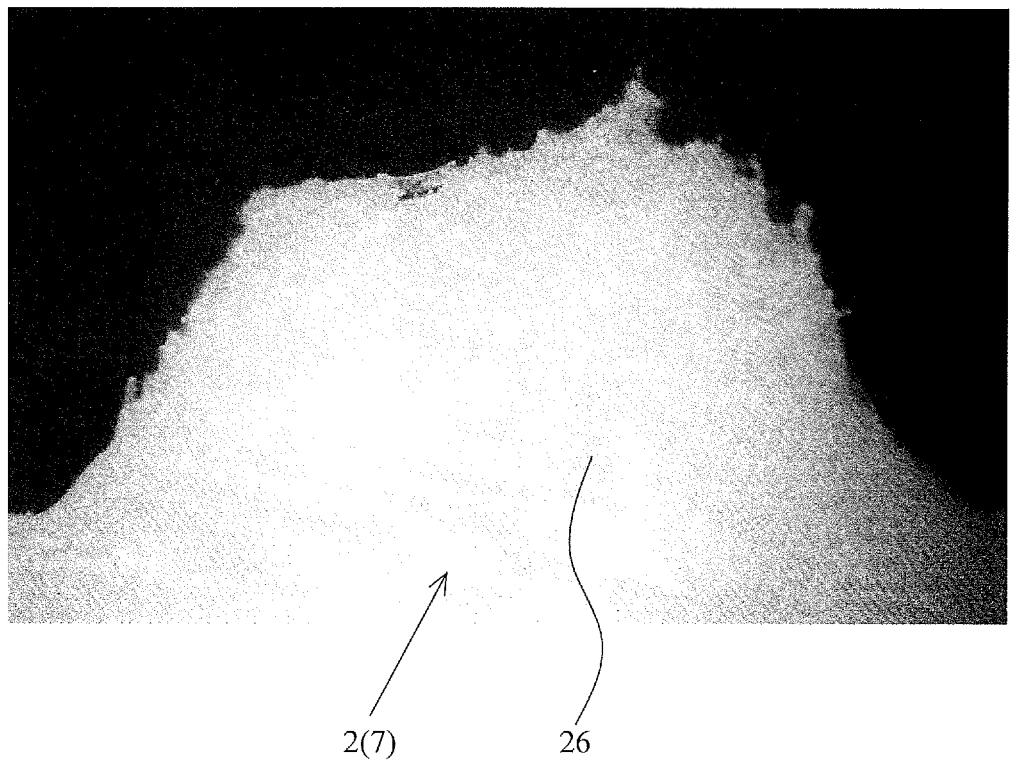
FIG. 6 is a partial enlarged view illustrating of the primary molded body obtained by taking a picture of reinforcing fiber exposed at the end of a tooth of the primary molded body.
Figure 7:
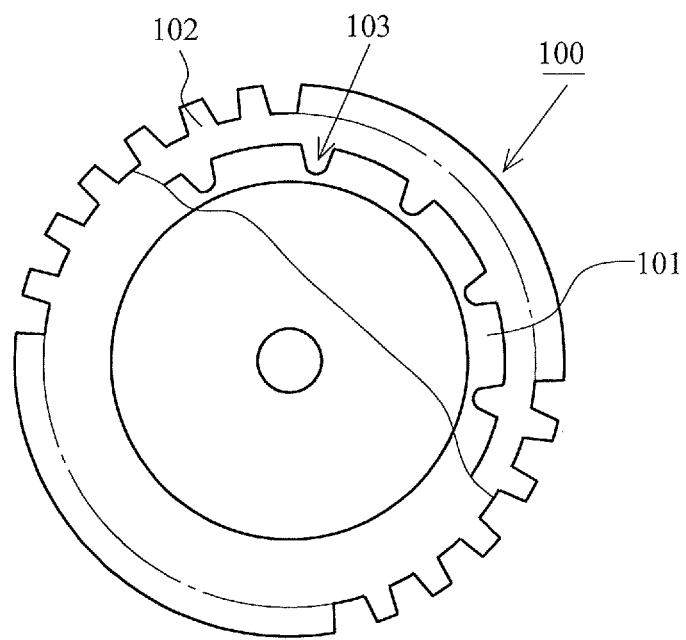
FIG. 7 is a front view illustrating a gear of a first conventional example cut partially.
Figure 8:
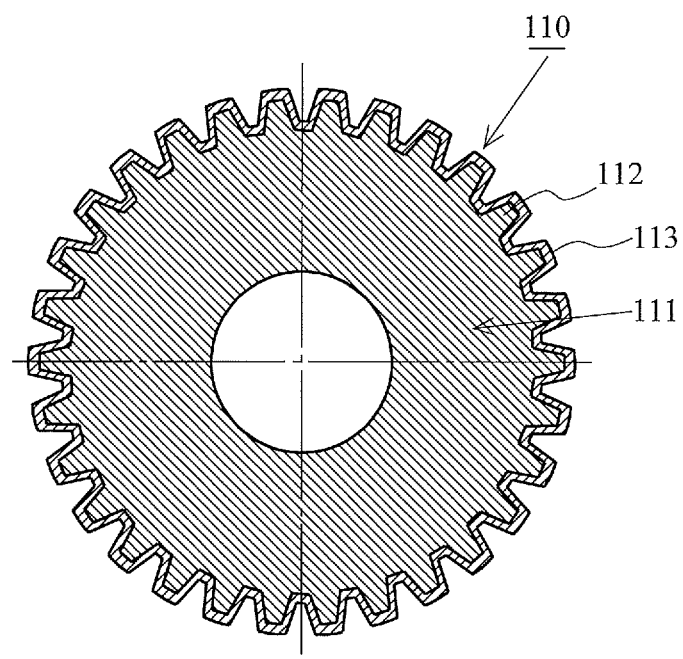
FIG. 8 is a cross sectional view illustrating a gear of a second conventional example taken along a virtual plane orthogonal to the center axis.

In the synthetic resin gear 1 as a secondary molded body illustrated in FIG. 2, the part excluding the recesses 8 of the primary molded body (core) 2 is covered with a reinforcing-fiber-free synthetic resin material (for example, nylon or POM) 13. The synthetic resin gear 1 includes a cylindrical boss 14 positioned at a radially inward end, a discoid web 15 extending radially outward from the center part of the shaft direction of the outer periphery surface of the boss 14, and a tooth part 16 formed at the radially outward end of the web 15. In addition, the tooth part 16 of the synthetic resin gear 1 includes an annular rim 17 connected to the radially outward end of the web 15 and a plurality of teeth 18 formed along the outer periphery of the rim 17. In addition, in the synthetic resin gear 1, the cylindrical boss 14 is formed only by the reinforcing-fiber-free synthetic resin material (abbreviated below as the covering material) 13 in a position radially inward of the hole 3 formed at the center of the primary molded body 2. In addition, in the synthetic resin gear 1, the cross section in FIG. 2(b) is line-symmetric with respect to a virtual line 20, positioned in the middle in the tooth width direction of the teeth 18, that is orthogonal to a shaft center 21. An engagement stress during power transmission repeatedly acts on the teeth 18 of the synthetic resin gear 1. However, in the synthetic resin gear 1, as described later, the molten covering material 13 osmoses through a reinforcing fiber 26 exposed from the surface of the tooth 7 of the primary molded body 2 during injection molding (see FIG. 6), the exposed reinforcing fiber 26 functions as an anchor, and the joint strength between the primary molded body 2 and the covering material 13 is improved by the anchor effect of the exposed reinforcing fiber 26. Therefore, the covering material 13 does not easily separate from the primary molded body 2 even when an engagement stress repeatedly acts on the interface between the primary molded body 2 and the covering material 13 to prevent the breakage of the teeth 18 caused by the separation at the interface between the primary molded body 2 and the covering material 13.

(Two-Color Molding Method)

FIGS. 3 and 4 illustrate the two-color molding method according to the first embodiment of the invention. FIG. 3 illustrates the injection molding process of the primary molded body 2. In addition, FIG. 4 illustrates the injection molding process of the synthetic resin gear 1 as a secondary molded body.

Figure 3C:
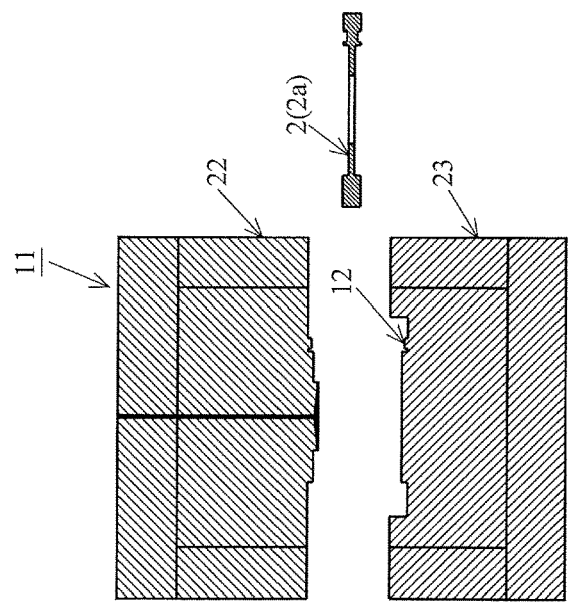
FIG. 3 is a diagram illustrating the injection molding process of the primary molded body 2.
Figure 3B:
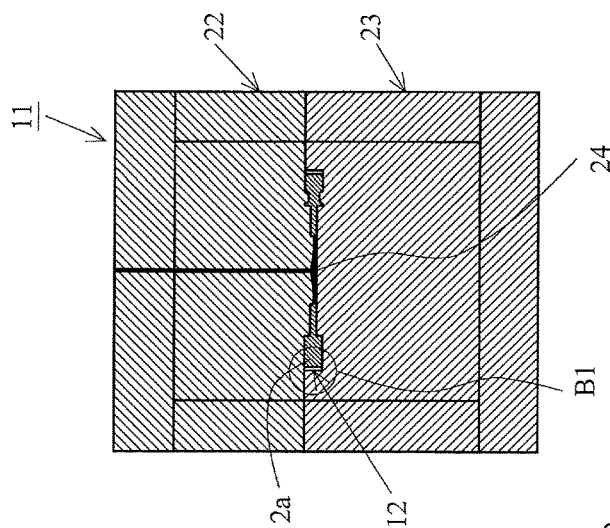
Figure 3D:
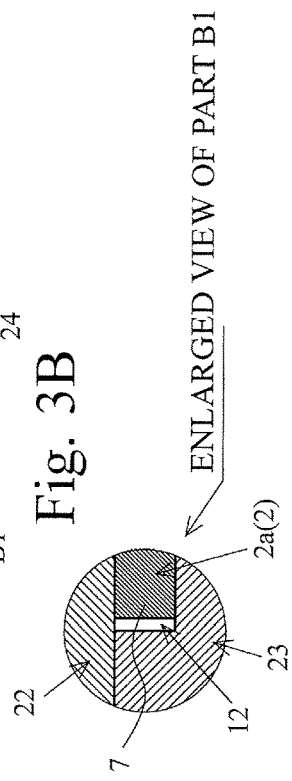
Figure 3A:
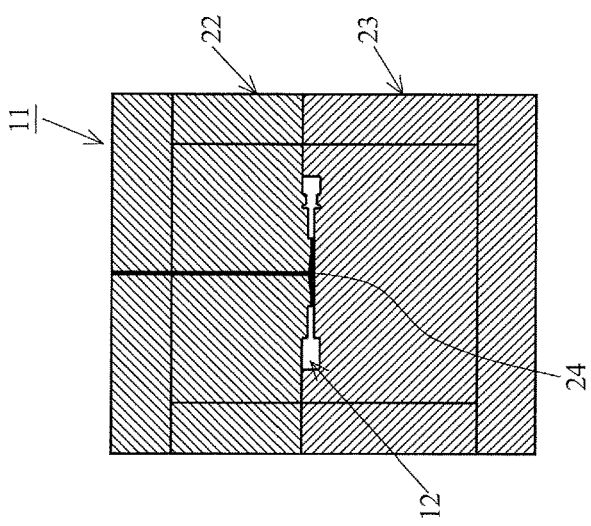

First, as illustrated in FIG. 3(a), a fixed mold 22 and a movable mold 23 of the primary molding die 11 are closed to form the primary molding cavity 12 (the primary molding cavity 12 for forming the primary molded body 2) substantially like a hollow disc in the abutting part between the fixed mold 22 and the movable mold 23.

Next, as illustrated in FIG. 3(b), the molten reinforcing-fiber-containing synthetic resin material 2a is injected into the primary molding cavity 12 from a disc gate 24 formed in the fixed mold 22 so as to open toward the radially inward end of the primary molding cavity 12. The molten reinforcing-fiber-containing synthetic resin material 2a injected into the primary molding cavity 12 flows through the primary molding cavity 12 from the radially inward end (one end) of the primary molding cavity 12 to the radially outward end (the other end) of the primary molding cavity 12. Then, a short shot is performed to prevent the radially outward end of the primary molding cavity 12 from being filled with the molten reinforcing-fiber-containing synthetic resin material 2a in the process of injection into the primary molding cavity 12 (see FIG. 3(d)). The recess 8 of the primary molded body 2 is formed in a position in which there is no effect of a short shot and the shape of the primary molding cavity 12 is accurately transferred (see FIG. 1). Note that the fixed mold 22 may be provided with a ring gate (not illustrated) instead of the disc gate 24 so as to inject the molten reinforcing-fiber-containing synthetic resin material 2a from the ring gate to the radially inward end of the primary molding cavity 12.

Next, as illustrated in FIG. 3(c), when the reinforcing-fiber-containing synthetic resin material 2a injected into the primary molding cavity 12 is cooled and solidified and the primary molded body 2 is formed in the primary molding cavity 12, the movable mold 23 of the primary molding die 11 is separated from the fixed mold 22 (mold separation), the primary molded body 2 in the primary molding cavity 12 is ejected by an eject pin (not illustrated) provided in the movable mold 23 and the primary molded body 2 is removed from the primary molding die 11.

Figure 5C:
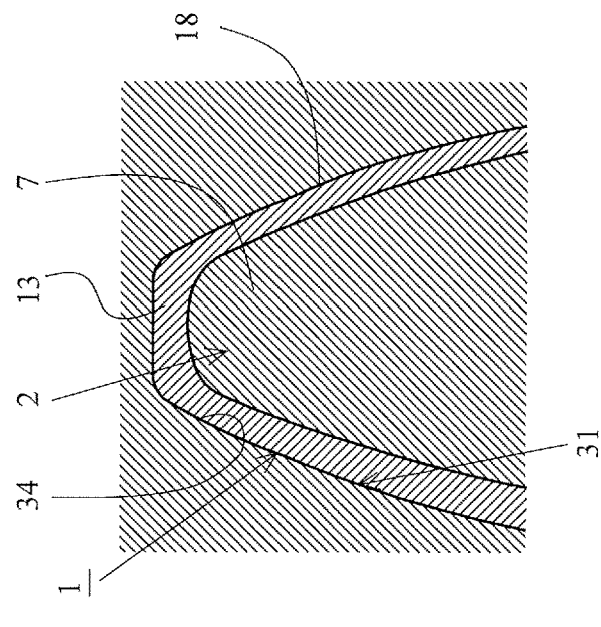
FIG. 5(c) is a diagram illustrating the state in which a reinforcing-fiber-free synthetic resin material (covering material) is injection-molded in the secondary molding cavity and a partial enlarged view illustrating the part of the secondary molding cavity in which a tooth is formed.
Figure 5B:
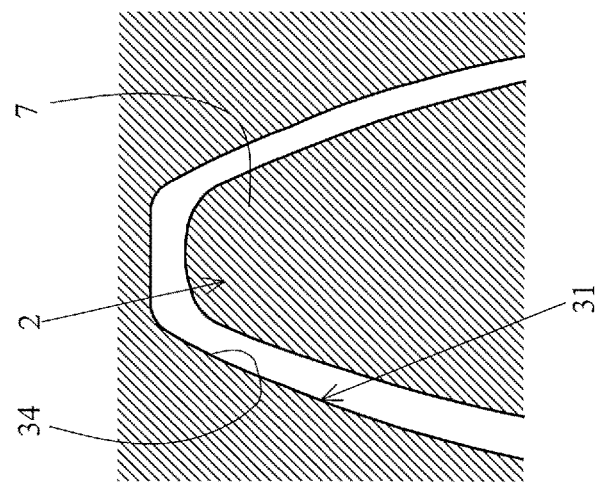
FIG. 5(b) is a diagram illustrating the state in which the primary molded body is accommodated in a secondary molding cavity and a partial enlarged view illustrating the part of the secondary molding cavity in which a tooth is formed.
Figure 5A:
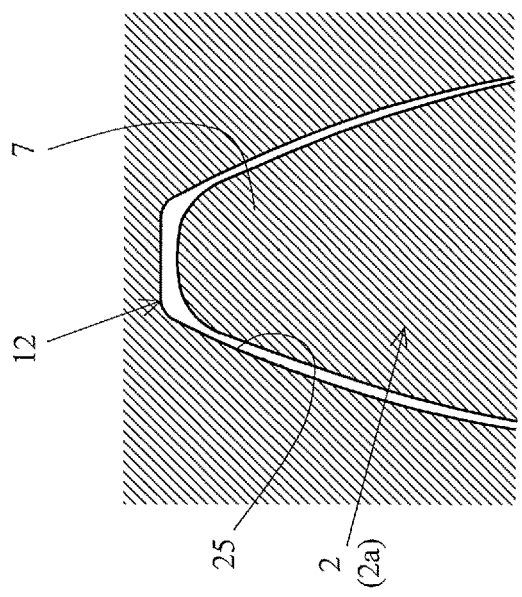
FIG. 5(a) is a diagram illustrating the state in which a short shot of a reinforcing-fiber-containing synthetic resin material is performed in a primary molding cavity and a partial enlarged view illustrating the part of the primary molding cavity in which a tooth is formed.

FIG. 5(a) is an enlarged view of a part 25 (part positioned at the other end) of the primary molding cavity 12 for forming a tooth. As illustrated in FIG. 5(a), in the injection molding process of the primary molded body 2, when a short shot of the molten reinforcing-fiber-containing synthetic resin material 2a is performed in the primary molding cavity 12, the tooth 7 of the primary molded body 2 is formed so as to become slightly smaller than the part 25 of the primary molding cavity 12 for forming a tooth and a slight space is formed between the tooth 7 of the primary molded body 2 and the part 25 of the primary molding cavity 12 for forming a tooth. This exposes the reinforcing fiber 26 on the surface of the tooth 7 of the primary molded body 2 (see FIG. 6). The degree of exposure of the reinforcing fiber 26 in the primary molded body 2 increases toward the tooth tip of the tooth 7 of the primary molded body 2 from the tooth root. On the other hand, in the primary molded body 2, the shape of the primary molding cavity 12 is accurately transferred in the part of the primary molded body 2 in which the reinforcing fiber 26 is not exposed.

Next, as illustrated in FIG. 4(a), a secondary molding die 27 is opened (a movable mold 28 of the secondary molding die 27 is separated from a fixed mold 30), the primary molded body 2 is accommodated in a portion (movable mold side cavity portion 31a) constituting a secondary molding cavity 31 (the secondary molding cavity 31 for forming the synthetic resin gear 1 as a secondary molded body) on the movable mold 28 side. At this time, the primary molded body 2 is supported in the state in which the recess 8 is engaged in a convexoconcave manner with a round-bar-shaped primary molded body positioning projection (primary molded body positioning means) 32 provided in the movable mold cavity portion 31a and the primary molded body 2 is positioned in the movable mold cavity portion 31a (see FIG. 4(e)).

Next, as illustrated in FIG. 4(b), the fixed mold 30 and the movable mold 28 of the secondary molding die 27 are closed and the secondary molding cavity 31 is formed in the abutting part between the fixed mold 30 and the movable mold 28. At this time, the primary molded body 2 is supported in the state in which the recess 8 on one side is engaged in a convexoconcave manner with the primary molded body positioning projection 32 of the movable mold 28 and the primary molded body 2 is positioned in the movable mold cavity portion 31a and the primary molded body 2 is supported in the state in which the recess 8 on the other side is engaged in a convexoconcave manner with a round-bar-shaped primary molded body positioning projection 33 of the fixed mold 30 and the primary molded body 2 is positioned in a fixed mold cavity portion 31b (the cavity portion of the fixed mold 30 side constituting the cavity 31 together with the movable mold cavity portion 31a) (see FIG. 4(f)).

FIG. 5(b) is an enlarged view illustrating a part 34 of the secondary molding cavity 31 for forming a tooth. As illustrated in FIG. 5(b), when the primary molded body 2 is accommodated in the secondary molding cavity 31 in the state in which the primary molded body 2 is positioned in the secondary molding cavity 31, a space to be filled with the molten covering material 13 is formed between the primary molded body 2 and the inner surface of the secondary molding cavity 31 (see FIGS. 4(b) and 4(f)). In the fixed mold 30, a plurality of pin gates 36 opened toward a part 35 of the secondary molding cavity 31 for forming a web are provided at regular intervals around a center axis 37 of the secondary molding cavity 31.

Next, as illustrated in FIGS. 4(c) and 5(c), the molten covering material 13 is injected into the secondary molding cavity 31 from the pin gates 36. In the injection molding process of the synthetic resin gear 1 as a secondary molded body, the secondary molding cavity 31 is fully filled with the covering material 13 (the secondary molding cavity 31 is fully filled without a short shot). The molten covering material 13 injected into the secondary molding cavity 31 osmoses through fine spaces of the reinforcing fiber 26 exposed in the primary molded body 2 (see FIG. 6) and firmly fixed to the surface of the primary molded body 2.

When the molten covering material 13 is injected into the secondary molding cavity 31, the recesses 8 positioned in the vicinity of the teeth 7 of the primary molded body 2 are engaged in a convexoconcave manner with the primary molded body positioning projections (primary molded body positioning means) 32 and 33 provided in the secondary molding cavity 31 and the vicinities of the teeth 7 of the primary molded body 2 are supported in the state in which the vicinities are positioned by the primary molded body positioning projections 32 and 33 provided in the secondary molding cavity 31, so that the primary molded body 2 does not move in the secondary molding cavity 31 and the primary molded body 2 is accurately covered with the covering material 13 having a predetermined film thickness. As a result, the exposed reinforcing fiber 26 of the primary molded body 2 is not exposed to the outside of the covering material 13 and does not make direct contact with the counterpart gear to be engaged.

Next, as illustrated in FIGS. 4(c) and 4(d), when the covering material 13 injected into the secondary molding cavity 31 is cooled and solidified and the synthetic resin gear 1 as a secondary molded body is formed in the secondary molding cavity 31, the movable mold 28 of the secondary molding die 27 is separated from the fixed mold 30 (mold separation), the synthetic resin gear 1 in the secondary molding cavity 31 is ejected by an eject pin (not illustrated) provided in the movable mold 28 and the synthetic resin gear 1 is removed from the secondary molding die 27. This completes the injection molding process of the two-color molded body (synthetic resin gear 1).

Effect of Present Embodiment

In the above two-color molding method according to the embodiment, by performing a short shot during injection molding of the primary molded body (core) 2, the reinforcing fiber 26 can be exposed from the tooth 7 of the primary molded body 2, the exposed reinforcing fiber 26 can function as an anchor, and the joint strength between the covering material 13 and the tooth 7 of the primary molded body 2 can be improved by the anchor effect of the exposed reinforcing fiber 26. Accordingly, it is not necessary to apply adhesive to the interface between the tooth 7 of the primary molded body 2 and the covering material 13 or to provide mechanical joint means having a convexoconcave or other mechanism in the joint part between the tooth 7 of the primary molded body 2 and the covering material 13, thereby preventing the production cost of the synthetic resin gear (two-color molded body) 1 from increasing.

In addition, in the two-color molding method according to the embodiment, by performing a short shot during injection molding of the primary molded body (core) 2, the reinforcing fiber 26 can be exposed from the tooth 7 of the primary molded body 2, the exposed reinforcing fiber 26 can function as an anchor, and the joint strength between the covering material 13 and the tooth 7 of the primary molded body 2 can be improved by the anchor effect of the exposed reinforcing fiber 26. Accordingly, the reinforcing-fiber-containing synthetic resin material 2a and the covering material 13 are not limited to a single material.

In addition, in the two-color molding method according to the embodiment, since the reinforcing-fiber-containing synthetic resin material 2a of the primary molded body 2 and the covering material 13 are not limited to a single material as described above, by appropriately selecting the reinforcing-fiber-containing synthetic resin material 2a of the primary molded body 2 and the covering material 13, the synthetic resin gear (two-color molded body) 1 having high strength and high accuracy can be formed and the synthetic resin gear (two-color molded body) 1 having the required characteristics (such as slidability, wear resistance, and quietness) can be manufactured.

In addition, in the two-color molding method according to the embodiment, the degree of exposure of the reinforcing fiber 26 in the primary molded body 2 increases toward the tooth tip from the tooth root of the tooth 7 of the primary molded body 2. Accordingly, in the synthetic resin gear (two-color molded body) 1 molded by the two-color molding method according to the embodiment, when the covering material 13 is softer than the reinforcing-fiber-containing synthetic resin material 2a of the primary molded body 2, since the thickness of the covering material 13 increases toward the tooth tip from the tooth root of the tooth 18 of the synthetic resin gear (two-color molded body) 1 and the softness of the surface of the tooth 18 increases toward the tooth tip from the tooth root of the tooth 18, the operation noise (noise during engagement with the counterpart gear) can be further reduced when used on the driven side.

In addition, in the two-color molding method according to the embodiment, since the tooth 7 of the primary molded body (core) 2 is firmly fixed to the covering material 13 by the anchor effect of the exposed reinforcing fiber 26 of the primary molded body 2, it is possible to prevent the breakage of the teeth 18 of the synthetic resin gear (two-color molded body) 1 caused by separation of the interface between the primary molded body 2 and the covering material 13.

In addition, in the synthetic resin gear 1 formed by the two-color molding method according to the embodiment, the recesses 8 of the primary molded body 2 are provided so as to one-to-one correspond to the teeth 7, the primary molded body positioning projections 32 and 33 formed on the secondary molding cavity 31 side are engaged with the recesses 8 of the primary molded body 7 when the primary molded body 7 is accommodated in the secondary molding cavity 31, the primary molded body positioning projections 32 and 33 adjust the flow of the molten covering material 13 when the molten covering material 13 is injected into the secondary molding cavity 31, and the molten covering material 13 can evenly flow through the parts 34 of the secondary molding cavity 31 for forming teeth, so the shapes of the teeth 18 can be formed accurately. Note that the number of the recesses 8 of the primary molded body 2 is determined based on the required gear accuracy and injection molding conditions and the like, and the number of the recesses 8 may be less than the number of the teeth 7.

(Modifications)

Although the synthetic resin gear 1 as a two-color molded body has been described in the above embodiment, the invention is not limited to the embodiment and rotation transmission means such as a sprocket, toothed belt pulley, or roller can also be formed as a two-color molded body. In the case of a sprocket, a short shot is performed during injection molding of the primary molded body (core) to expose reinforcing fiber from the surface of the tooth positioned at the radially outward end of the primary molded body, and the tooth from which reinforcing fiber is exposed is covered with a covering material. In addition, in the case of a toothed belt pulley, a short shot is performed during injection molding of the primary molded body to expose reinforcing fiber from the surface of the tooth positioned at the radially outward end of the primary molded body, and the tooth from which reinforcing fiber is exposed is covered with a covering material. In addition, in the case of a roller, a short shot is performed during injection molding of the primary molded body (core) to expose reinforcing fiber from the surface of the cylindrical section positioned at the radially outward end of the primary molded body, and the cylindrical section from which reinforcing fiber is exposed is covered with a covering material. Such rotation transmission means is formed by applying the two-color molding method for molding the synthetic resin gear 1 according to the above embodiment.

In addition, although the recesses 8 are formed in the primary molded body 2 as positioning engagement parts in the above embodiment, round-bar-shaped projections may be used as positioning engagement parts. On the other hand, in the secondary molding cavity 31, recesses to be engaged in a convexoconcave manner with the round-bar-shaped projections of the primary molded body 2 may be used as the primary molded body positioning means.

REFERENCE SIGNS LIST

1: secondary molded body (two-color molded body, synthetic resin gear)
2: primary molded body (core)
2a: reinforcing-fiber-containing synthetic resin material
11: primary molding die
12: primary molding cavity
13: covering material (reinforcing-fiber-free synthetic resin material)
26: reinforcing fiber
27: secondary molding die
31: secondary molding cavity

The invention claimed is:

1. A two-color molding method comprising:
injecting a molten reinforcing-fiber-containing synthetic resin material into a primary molding cavity of a primary molding die,
forming a primary molded body made of the reinforcing-fiber-containing synthetic resin material,
accommodating the primary molded body in a secondary molding cavity of a secondary molding die,
injecting a molten reinforcing-fiber-free synthetic resin material into the secondary molding cavity, and
covering a surface of the primary molded body with the reinforcing-fiber-free synthetic resin material to mold a secondary molded body,
wherein, when the molten reinforcing-fiber-containing synthetic resin material is injected into the primary molding cavity, the molten reinforcing-fiber-containing synthetic resin material is caused to flow from one end toward another end of the primary molding cavity and a short shot is performed to prevent the other end of the primary molding cavity from being filled with the molten reinforcing-fiber-containing synthetic resin material, and
reinforcing fiber is exposed by forming a part where a shape of the primary molding cavity is not accurately transferred in a part of the primary molded body, the part being positioned at the other end of the primary molding cavity, and the part in which the reinforcing fiber is exposed is covered with the reinforcing-fiber-free synthetic resin material.

2. A two-color molded body formed by
injecting a molten reinforcing-fiber-containing synthetic resin material into a primary molding cavity of a primary molding die,
forming a primary molded body made of the reinforcing-fiber-containing synthetic resin material,
accommodating the primary molded body in a secondary molding cavity of a secondary molding die,
injecting a molten reinforcing-fiber-free synthetic resin material into the secondary molding cavity, and
covering a surface of the primary molded body with the reinforcing-fiber-free synthetic resin material,
wherein, when the molten reinforcing-fiber-containing synthetic resin material is injected into the primary molding cavity, the molten reinforcing-fiber-containing synthetic resin material is caused to flow from one end toward another end of the primary molding cavity and a short shot is performed to prevent the other end of the primary molding cavity from being filled with the molten reinforcing-fiber-containing synthetic resin material, and
reinforcing fiber is exposed by forming a part where a shape of the primary molding cavity is not accurately transferred in a part of the primary molded body, the part being positioned at the other end of the primary molding cavity, and the part in which the reinforcing fiber is exposed is covered with the reinforcing-fiber-free synthetic resin material.

3. The two-color molding method according to claim 1,
wherein the primary molded body is a primary molded body of a gear,
the secondary molded body is a gear made of synthetic resin, and
the reinforcing fiber is exposed in a part of the primary molded body, the part being positioned at the other end of the primary molding cavity and forming a tooth of the gear, and the part forming the tooth of the gear in which the reinforcing fiber is exposed is covered with the reinforcing-fiber-free synthetic resin material.

4. The two-color molded body according to claim 2,
wherein the primary molded body is a primary molded body of a gear,
the secondary molded body is a gear made of synthetic resin, and
the reinforcing fiber is exposed in a part of the primary molded body, the part being positioned at the other end of the primary molding cavity and forming a tooth of the gear, and the part forming the tooth of the gear in which the reinforcing fiber is exposed is covered with the reinforcing-fiber-free synthetic resin material.

5. The two-color molding method according to claim 3,
wherein the primary molded body has a positioning engagement part to be engaged in a convexo-concave manner with primary molded body positioning means of the secondary molding cavity in a part near the tooth in which a shape of the primary molding cavity is accurately transferred.

6. The two-color molded body according to claim 4, wherein the primary molded body has a positioning engagement part to be engaged in a convexo-concave manner with primary molded body positioning means of the secondary molding cavity in a part near the tooth in which a shape of the primary molding cavity is accurately transferred.

* * * * *